United States Patent [19]

Baschung

[11] 4,368,969
[45] Jan. 18, 1983

[54] APPARATUS FOR GUIDING FINITE FILM STRIP PORTIONS DURING THEIR CONVEYANCE

[75] Inventor: Michael Baschung, Zurich, Switzerland

[73] Assignee: Gretag Aktiengesellschaft, Regensdorf, Switzerland

[21] Appl. No.: 318,252

[22] Filed: Nov. 4, 1981

[30] Foreign Application Priority Data

Nov. 7, 1980 [CH] Switzerland .................. 8283/80

[51] Int. Cl.³ .................. G03D 3/13; G03B 27/52
[52] U.S. Cl. .................. 354/339; 355/27; 355/76; 226/196
[58] Field of Search .............. 354/319, 320, 321, 322, 354/338, 339, 340, 344; 226/91, 92, 93, 96, 170, 171, 172, 173, 196, 198; 355/76, 27, 50, 51, 64, 97–103

[56] References Cited

U.S. PATENT DOCUMENTS 4,065,042 12/1977 Zieliwski ........................ 226/92
4,264,197 4/1981 Pone et al. ..................... 355/50
4,330,191 5/1982 Rawlings et al. ............... 226/92

Primary Examiner—L. T. Hix
Assistant Examiner—Alan Mathews
Attorney, Agent, or Firm—Burns, Doane, Swecker & Mathis

[57] ABSTRACT

Film strip portions are attached spacedly on a carrier strap so as to project with substantially their entire bredth from said carrier strap, thus constituting together with the latter a composite unit suitable for being conveyed through a photographic development plant or the like. An apparatus comprising guiding means having two longitudinal guiding edges serves for laterally guiding this composite unit; one of these longitudinal guiding edges serves for guiding the longitudinal edge of the carrier strap opposite to said edge thereof from which the film strip portions project. In order to ensure an accurate lateral guidance independently of the total bredth of the composite unit which may vary due to inexact attachment of the film strip portions to the carrier strap or due to a bend in the film, the second longitudinal guiding edge is adapted to engage the first longitudinal edge of the carrier strap, by contact with the latter carrier strap edge underneath the film strip portions projecting therefrom.

9 Claims, 4 Drawing Figures

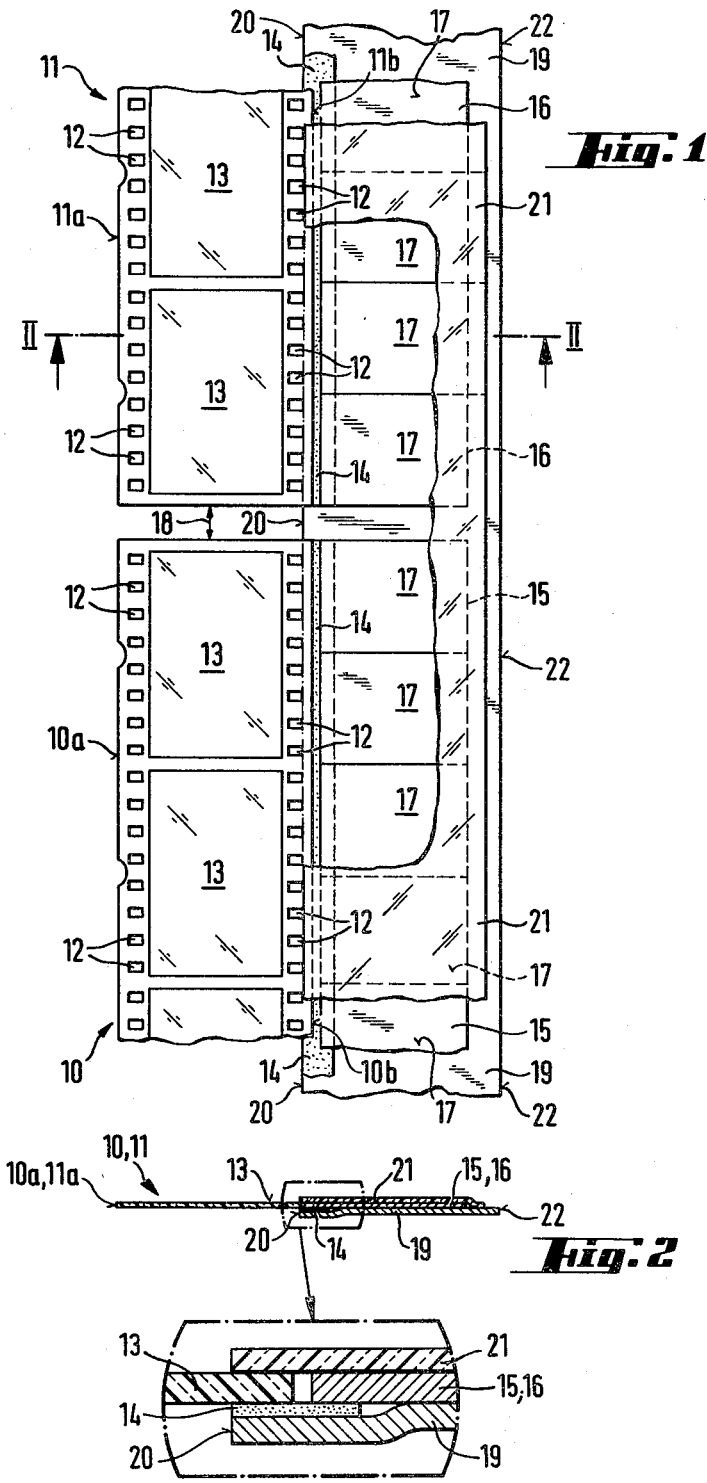

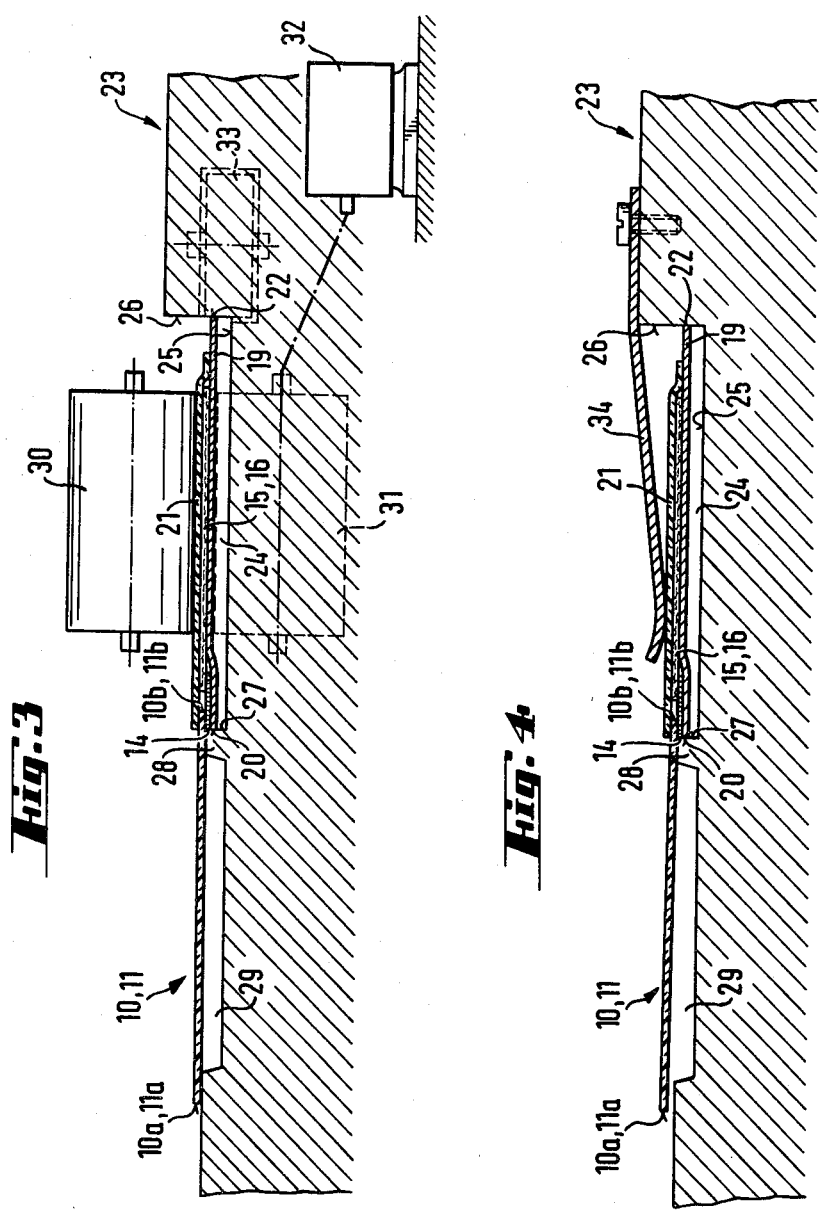

APPARATUS FOR GUIDING FINITE FILM STRIP PORTIONS DURING THEIR CONVEYANCE

BACKGROUND OF THE INVENTION

This invention relates to improvements in an apparatus for guiding finite film strip portions during their conveyance, for instance through a developing plant or the like, wherein the film strip portions are individually attached, spaced from one another, to a common carrier strap or belt and project laterally only from a first longitudinal edge of such strap or belt, and wherein the apparatus comprises guiding means having a first longitudinal guiding edge for guidingly engaging a second longitudinal edge of said carrier strap being opposite the said first carrier strap edge, i.e. the carrier strap edge from which the film strip portions project laterally, and wherein the said guiding means also have a second longitudinal guiding edge.

In particular when processing selected portions of a developed photographic film strip, which portions contain a single picture or several adjacent pictures, selected from among the total number of pictures present on the developed strip, and of which portions copies have been re-ordered, they are conveyed through an automatic copying machine; in this case it is conventional to fasten the individual film strip portions at one of their two longitudinal edges on a conveyer strap or belt; or, in the case that the film strips are provided with a lateral re-order tab or label, to fasten them with the free longitudinal edge of such re-order tab on a conveyer strap, in such a manner that the film strip portions protrude laterally from the said strap. The conveying means employed for conveying the film strip portions to the various processing stations engages the carrier strap or belt transporting them, so that the film strip portions themselves, or at least the parts thereof representing the image areas or picture frames, only make contact with parts of the apparatus as little as possible or, preferably, not at all. It is, however, essential that the composite unit which comprises the carrier belt and the film strip portions attached thereto, which latter portions may have affixed thereto re-order tabs or the like, is guided also laterally with great accuracy, so that their exact positioning, for instance, in the illuminating station, is assured.

In a known apparatus of the initially described type the second, free longitudinal edge of the film strip portions serves for the guidance of those longitudinal edges of the film strip portions which are spaced from the carrier strap.

For reasons which will be explained hereinafter, this known guiding means does not offer a sufficiently accurate lateral guidance of the film strip portions. Thus, while the tolerances in transverse extension, or play in bredth, of the film strip portions as well as of the carrier strap can be considered to be so small as to be negligible, it cannot be safely assumed that such narrow tolerances can also be maintained when connecting the film strip portions with the carrier belt, even if such connection is achieved by close abutment of the two members to be joined together; consequently, the play in bredth of the composite unit is enlarged, and the distance between the two longitudinal guiding edges of the apparatus guiding means must be adjusted to fit the largest play expected in the bredth of the composite unit. Moreover, the successive longitudinal edges, of the film strip portions spaced away from the carrier strap, do not form an uninterrupted straight line. Due to this fact, in places where the associated longitudinal guiding edge of the apparatus is interrupted by a gap, the forward free corner (i.e. the corner moving ahead of the next, trailing corner, in the direction of movement of the composite unit) of a film strip portion risks to become caught at this gap in the apparatus guiding edge. Furthermore, these film strip portions are not necessarily of flat shape. Some of them may be curved about an axis which is parallel to their longitudinal direction, thus diminishing the total bredth of the composite unit. Also, the film strip portions to be processed, in particular in successive operations, may be of different bredths depending on their type and standard data. This requires that the known apparatus of the initially described kind be adjusted anew to a determined bredth for each successive processing operation and can only guide accurately during such operation those film strip portions having this preset particular bredth.

In a further known apparatus, the lateral longitudinal guidance is effected solely with regard to the carrier strap. For this purpose, the carrier strap is provided with a conveying and guiding perforation which extends in longitudinal direction in a simple way as in a punched tape, and the holes of which perforation are engaged by the pins of a sprocket wheel. However, even this solution of the guidance problem is not entirely satisfactory. For, on the one hand, bringing about an engagement between the carrier strap and the sprocket wheel requires additional operational steps, while, on the other hand, the carrier strap must be made unduly broad, in particular when the film strip portions bear re-order labels, in order to avoid that holes of the perforation become covered by reorder labels and adhesive tapes. Furthermore, when fitting two carrier straps together, special attention must be paid to the graduations of their respective conveying and guiding perforations. Finally, the costs of a conveyer strap having an accurate conveying and guiding perforation cannot be considered as negligible.

OBJECTS AND SUMMARY OF THE INVENTION

It is, therefore, an object of the invention to provide an apparatus of the initially defined type which, while avoiding the above-described drawbacks of the known apparatus, affords a better and more expedient guidance of such film strip portions affixed to a carrier strap.

This object and others which will become apparent from the further description given hereinafter are achieved, in accordance with the invention, by an apparatus of the initially described type in which the said second longitudinal guiding edge of said guiding means is of such configuration and location that it is adapted for engaging the said first longitudinal carrier strap edge in said composite unit, free from interfering with the conveyance of said film strip portions projecting from said first longitudinal carrier strap edge.

This apparatus according to the invention can be used in particular in a machine for producing copies from selected portions of a film strip.

BRIEF DESCRIPTION OF THE DRAWINGS

The apparatus of the invention will now be described in more detail in connection with the accompanying drawing in which:

FIG. 1 is a partial top view of a carrier strap to which two "tabbed" film strip portions have been attached, thus forming a composite unit;

FIG. 2 is a cross-sectional view of the composite unit taken along a plane indicated by II—II in FIG. 1;

FIG. 3 is a schematic cross-sectional view through a preferred embodiment of the guiding means of said apparatus, serving for guiding the composite unit shown in FIGS. 1 and 2; and FIG. 4 is a schematic cross-sectional view through another embodiment of the guiding means which is somewhat different of that of FIG. 3.

DETAILED DESCRIPTION OF THE DRAWING

First referring to FIGS. 1 and 2, there are shown parts of two film strip portions 10 and 11, for instance those of a 135 film (of 24×36 mm picture size) which are provided in the zones along their longitudinal edges 10a, 10b and 11a, 11b, respectively, with the usual transport perforations 12. The picture frames of the two film strip portions 10 and 11 are designated by 13.

To each of the two film strip portions 10 and 11, there is attached, by means of an adhesive tape 14, at their respective longitudinal edges 10b and 11b, respectively, which edges are shown in FIG. 1 as the lower ones, re-order tabs 15 and 16 of a material on which the user can write in ink, pencil or the like, thus obtaining a composite unit.

Photographic films or film strip portions which have been developed in a developing plant are as a rule returned to the customer in this form. On the re-order tabs 15 and 16, there are printed spaces or headings 17 which are fairly closely associated with the picture frames 13 and in which the customer, when placing a subsequent order for additional copies, can enter details such as the number and size of the desired copies.

The film strip portions are then delivered in the described state to the copying plant. In this plant, the film strip portions 10 and 11 together with the respective re-order tabs 15,16 are then placed on a carrier strap 19, leaving a spacing 18 between them in such a position that only the re-order tabs 15 and 16 rest on the carrier strap 19 while the film strip portions 10 and 11 protrude almost with their entire width beyond the longitudinal edge 20 of the carrier strap 19.

An uninterrupted length of transparent adhesive tape 21 the bredth of which is preferably greater than the width of the tabs 15, but preferably smaller than the bredth of the carrier straps 19, is then placed over the tabs and the portion thereof extending beyond the free longitudinal edge of the tabs 15 is glued onto the underlying surface of the carrier strap 19 while any portion of the tape 21 covering a marginal zone of the film strip portions 10,11 is glued to the surface portion of the latter covered by it, whereby the film strip portions 10,11 are safely affixed to the carrier strap 19.

The carrier strap 19 can be made of a paper which is strong enough to resist the stresses to which it becomes subjected during the copying operation and the thickness of which is preferably as low as a few tenths of a millimeter. Care must be taken that the longitudinal edge 22 of the carrier strap 19 opposite the longitudinal edge 20 remains free, i.e. it must not be covered by either the tabs 15 or the adhesive tape 21.

The composite unit which is thus obtained is suitable for being transported with very accurate lateral guidance in the apparatus according to the invention, preferred embodiments of which are illustrated in FIGS. 3 and 4. In these figures the reference numerals 10 to 22 have not been indicated for the sake of greater clarity.

In this embodiment, the lateral guidance of the above-described composite unit is effected in a longitudinal groove 24 of low depth which has been machined or produced in a similar manner in the top surface of a supporting member 23. The longitudinal groove 24 is delimited on one of its longitudinal sides by a first longitudinal guiding wall or shoulder 26 which projects at a right angle above the groove bottom 25, and on its opposite longitudinal side by a second longitudinal guiding edge or shoulder 27 which likewise projects upwardly at a right angle from the groove bottom 25, but has a height of only a few tenths of a millimeter. Its height, is preferably equal to or slightly greater than the thickness of the carrier strap; the latter is the case in the embodiment of FIG. 3. The width of the groove 24, i.e. the distance between the longitudinal guiding walls 26 and 27 thereof corresponds closely to the bredth of the carrier strap 19 with such play that the latter can slide smoothly through the groove 24 in longitudinal direction. The composite unit is placed with the uncovered side of its carrier strap 19 facing downwardly onto the groove 25 so that the free longitudinal strap edge abuts against the guiding shoulder 26 while the longitudinal edge 20 is in contact with the guiding edge 27 of groove 24.

Underneath the image frames of the film strip portions 10,11, a second flat groove 29 which extends parallel to the groove 24, is machined into the surface of support 23, leaving a narrow ridge 28 protruding between the two grooves. A marginal zone of the film strip portions 10, 11 which extends between the picture frames 13 and the longitudinal film strip portion edges 10b, 11b rests on the ridge 28 during longitudinal displacement of the composite unit while the picture frames 13 will be free from sliding contact during such movement thanks to the provision of second groove 29.

The advancing movement of the composite unit can be achieved by a pair of driving rollers 30 and 31 (indicated by dashed lines in FIG. 3) of which roller 30 frictionally engages the upper side of the adhesive tape 21, while the roller 31 engages the underside of the carrier strap 19. One of these rollers, e.g. roller 31 is coupled to a stepping motor 32. Inside the guiding shoulder 26, guiding roller means such as freely rotatable rollers 33, balls of a ball bearing or the like can be housed so that they protrude very slightly from the longitudinal groove sidewall of guiding shoulder 26 and tangentially engage with their surfaces the free longitudinal edge 22 of the carrier strap 19. In order to permit these roller means to compensate for minor variations in the bredth of the carrier strap 19, they can be supported slightly resiliently in a direction transverse to the direction of movement of the composite unit.

In order to prevent the carrier strap 19 from becoming disengaged from its guiding groove 24 and to safely retain the strap 19 of the composite unit in that groove, retaining means 34, for instance, in the form of flat pieces of sheet metal, rollers or blade springs 34 can be provided, e.g. by mounting them on top of the support 23 so as to extend transversely across the groove 24 and press on the adhesive tape 21 borne by the taps 15 and the carrier strap underneath the latter, thus urging this part of the composite unit into light engagement with the groove 24. When the height of the second longitudinal guiding edge 27 of groove 24 slightly exceeds the thickness of the carrier strap 19, then the retaining blade springs or the like means 34 affords the additional advantage of causing the film strip portions 10 and 11, which extend across the second groove 29, to become slightly tilt upwardly with the ridge 28 as fulcrum line, and thus, these portions containing the image frames are conveyed along free from any contact with the part of the support 23 containing the second groove 29, and yet with great accuracy.

Of course, in order to be usable in the guiding means of the apparatus according to the invention, the carrier strap must be of a single determined bredth, irrespective of the bredths of the film strips, portions of which are attached thereto.

I claim:

1. In an apparatus for guiding finite film strip portions during their conveyance through a photographic developing or copying plant, wherein the film strip portions are individually attached, spaced from one another, to a common carrier strap and project laterally only from a first longitudinal edge of such strap, resulting in a composite unit, and wherein the apparatus comprises guiding means having a first longitudinal guiding edge for guidingly engaging a second longitudinal edge of said carrier strap opposite said first edge thereof, the improvement of said guiding means comprising a second longitudinal guiding edge of such configuration and location in said apparatus that it is adapted for engaging said first longitudinal carrier strap edge.

2. The improvement of claim 1, wherein said guiding means comprises a support having an upper surface, a longitudinal first groove in said upper support surface, said first groove having a flat bottom, a first longitudinal shoulder constituting one sidewall of said first groove and having said first longitudinal guiding edge, and a second longitudinal sidewall of said first groove having said second longitudinal guiding edge, the depth of said first groove being at least equal or larger than the thickness of said carrier strap.

3. The improvement of claim 2, wherein the width of said first groove is such as to accomodate said carrier strap free from friction in said groove with said second, free longitudinal carrier strap edge being movable in guiding contact and substantially free from friction along said first longitudinal shoulder, and said first longitudinal edge of said carrier strap being movable in guiding contact and substantially free from friction along said second longitudinal sidewall, during conveyance of said composite unit in longitudinal direction, while said film strip portions project from said first longitudinal carrier edge strap and above said upper support surface.

4. The improvement of claim 2 or 3, wherein said guiding means comprise a second groove extending parallel to said first groove, and said film strip portions of said composite unit extend across said second groove, a longitudinal ridge separating said first groove and said second groove.

5. The improvement of claim 2 or 3, wherein said guiding means comprise loose rollers housed in said shoulder of said support and protruding with a peripheral section from said shoulder into said groove for rollingly engaging said second, free longitudinal edge of said carrier strap.

6. The improvement of claim 2 or 3, wherein said guiding means comprise retaining means urging the carrier strap lightly into said groove, thereby retaining said carrier strap in said groove during conveyance of said composite unit in longitudinal direction.

7. The improvement of claim 6, wherein said retaining means comprise blade springs.

8. The improvement of claim 6, wherein said retaining means are rollers.

9. The improvement of claim 4, wherein said guiding means comprise loose rollers housed in said shoulder of said support and protruding with a peripheral section from said shoulder into said groove for rollingly engaging said second, free longitudinal edge of said carrier strap.

* * * * *